United States Patent

Hiratsuka et al.

[11] Patent Number: 6,072,692
[45] Date of Patent: Jun. 6, 2000

[54] ELECTRIC DOUBLE LAYER CAPACITOR HAVING AN ELECTRODE BONDED TO A CURRENT COLLECTOR VIA A CARBON TYPE CONDUCTIVE ADHESIVE LAYER

[75] Inventors: Kazuya Hiratsuka; Takeshi Morimoto; Manabu Suhara; Takeshi Kawasato; Manabu Tsushima, all of Yokohama, Japan

[73] Assignee: Asahi Glass Company, Ltd., Tokyo, Japan

[21] Appl. No.: 09/168,090

[22] Filed: Oct. 8, 1998

[51] Int. Cl.[7] .......................................... H01G 9/00
[52] U.S. Cl. ........................ 361/502; 361/509; 29/25.03; 427/79
[58] Field of Search .................................... 361/502, 508, 361/509, 516, 528, 529, 532; 29/25.03; 427/79; 252/62.2

[56] References Cited

U.S. PATENT DOCUMENTS

| | | | |
|---|---|---|---|
| 4,862,328 | 8/1989 | Morimoto et al. | 361/502 |
| 5,621,607 | 4/1997 | Farahmandi et al. | 361/502 |
| 5,754,393 | 5/1998 | Hiratsuka et al. | 361/505 |
| 5,786,981 | 7/1998 | Aoki et al. | 361/502 |
| 5,888,673 | 3/1999 | Kawasato et al. | 429/329 |
| 5,953,204 | 9/1999 | Suhara et al. | 361/502 |
| 5,969,936 | 10/1999 | Kawasato et al. | 361/502 |

*Primary Examiner*—Kristine Kincaid
*Assistant Examiner*—Anthony Dinkins
*Attorney, Agent, or Firm*—Oblon, Spivak, McClelland, Maier & Neustadt, P.C.

[57] ABSTRACT

An electric double layer capacitor including an electrode containing a carbonaceous material having a specific surface area of at least 500 $m^2/g$, and an organic electrolytic solution capable of forming an electric double layer at the interface with the electrode, wherein the electrode is bonded to a current collector via a carbon type conductive adhesive layer containing a conductive carbon material and a polyimide resin.

9 Claims, No Drawings

ELECTRIC DOUBLE LAYER CAPACITOR HAVING AN ELECTRODE BONDED TO A CURRENT COLLECTOR VIA A CARBON TYPE CONDUCTIVE ADHESIVE LAYER

BACKGROUND OF THE INVENTION

1. Field of the Invention

The present invention relates to an electric double layer capacitor, particularly an electric double layer capacitor excellent in the operation reliability.

2. Discussion of Background

The electric double layer capacitor is based on a principle to store electric charge in an electric double layer formed on the surface of an electrode impregnated with an electrolytic solution. In order to obtain a high capacitance density, it is common to employ as a material for the electrode, a carbonaceous material such as activated carbon, carbon black or fine particles of a metal or conductive metal oxide, having a high specific surface area. For efficient charging and discharging, the electrode is bonded to an electro-conductive foil or layer having low resistance, such as a metal or graphite which is called a current collector. For the current collector, it is common to employ a valve metal such as aluminum or a stainless steel such as SUS304 or SUS316L, which is electrochemically highly corrosion resistant.

As an electrolyte for the electric double layer capacitor, an organic electrolytic solution and an aqueous electrolytic solution are available. However, an attention has been drawn to an electric double layer capacitor employing an organic electrolytic solution, as the operating voltage is high, and the energy density in the charged state can be made high. In the case of an electric double layer capacitor employing an organic electrolytic solution, if water is present in the interior of an electric double layer capacitor, the water is electrolyzed and deteriorates the performance. Accordingly, the electrode is required to have water completely removed, and usually it is dried by heating under reduced pressure.

As the electrode, activated carbon is mainly used. However, activated carbon is usually in a powder form. Accordingly, it is common to use an electrode assembly which is made by firstly molding carbon into a sheet form by using a binder containing a fluorine-containing resin such as polytetrafluoroethylene (hereinafter referred to as PTFE), and then electrically connecting it to a current collector. It has been proposed to intimately contact and bond the electrode and the current collector via a conductive adhesive layer so as to minimize the electric contact resistance between the two. However, a fluorine-containing resin has a nature difficult to bond, and thus it is difficult to raise the bond strength.

The conductive adhesive layer is required to be electrochemically corrosion resistant. Therefore, as a filler which provides an electric conductivity for the conductive adhesive layer, a carbon material such as carbon black or graphite is mainly used. Further, in order to secure the bond strength, various binder components for the conductive adhesive layer have been studied, and resins such as cellulose and polyvinyl alcohol (JP-A-59-3915, JP-A-62-200715) or inorganic binder components such as water glass have been known.

However, these resins are not sufficiently resistant against an organic electrolytic solution, and if a conductive adhesive containing such a resin as a binder is used, the electrode and the current collector may likely undergo peeling. Further, the heat resistance of such resins is about 150° C. at highest, whereby drying treatment by heating can not be applied after the electrode and the current collector are bonded. Therefore, the remaining water adsorbed on the activated carbon can not be completely removed, and there has been a problem such that the performance of the electric double layer capacitor tends to be poor due to the electrolysis of the remaining water.

The inorganic binder such as water glass is highly heat resistant, but it has had a problem that the bond strength of the electrode and the metal current collector tends to be insufficient, or the performance of the electric double layer capacitor tends to deteriorate due to the elution of alkali components or the remaining water.

SUMMARY OF THE INVENTION

It is an object of the present invention to provide an electric double layer capacitor, wherein the electric connection between the current collector and the electrode is strong, and the performance deterioration is less likely to occur even when it is used for a long period of time.

The present invention provides an electric double layer capacitor comprising an electrode containing a carbonaceous material having a specific surface area of at least 500 $m^2/g$, and an organic electrolytic solution capable of forming an electric double layer at the interface with the electrode, wherein the electrode is bonded to a current collector via a carbon type conductive adhesive layer containing a conductive carbon material and a polyimide resin, and a process for its production.

DETAILED DESCRIPTION OF THE PREFERRED EMBODIMENTS

In the electric double layer capacitor of the present invention, the carbon type conductive adhesive layer to bond the electrode and the current connector, contains a conductive carbon material and a polyimide resin. In this specification, the "polyimide resin" is a general term for a resin having imide bonds in the repeating units on its main chain, and it acts as a binder component of the conductive adhesive layer. The polyimide resin is highly heat resistant, i.e. its heat-proof temperature is usually within a range of from 200° C. to 400° C.

The polyimide resin is excellent in chemical resistance, mechanical properties, dimensional stability and electric properties. The polyimide resin is divided roughly into a linear resin and a curable resin. The linear resin includes a thermoplastic resin and a non-thermoplastic resin, and the curable resin includes a thermosetting resin and a photo-setting resin. Each type of the polyimide resin may be used preferably in the form of a varnish having the resin dissolved in a solvent as an adhesive.

In the present invention, a polyamidoimide resin is particularly preferred among the polyimide resins. The "polyamidoimide resin" is a general term for a resin having imide bonds and amide bonds in the repeating units on its main chain, and it is rich in flexibility and excellent in wear resistance. It may, for example, be a condensate of trimellitic acid and methylenebisaniline. This condensate can suitably be used in the present invention.

The polyimide resin varnish may be one having a solvent-soluble polyimide resin dissolved in a solvent, or one having a precursor of a polyimide resin such as polyamic acid dissolved in a solvent, which becomes a polyimide resin by heat treatment at a high temperature (hereinafter referred to as a precursor for a polyimide resin in this specification). Either one can be used similarly.

The varnish having the polyimide resin dissolved in a solvent, may, for example, be "U-varnish" by Ube Industries (one having polyamic acid dissolved in a solvent), "Rikacoat" by Shin-Nihon Rika (one having a solvent-soluble polyimide resin dissolved in a solvent), "Pyer ML" by Du Pont (E.I.) de Nemours, "PIQ" by Hitachi Chemical, "Toraynese" by TORAY INDUSTRIES, "Pymel" by ASAHI CHEMICAL INDUSTRY, "N7525" or "NA-11" by TOYOBO. Among them, "N7525" and "NA-11" are the varnishes which become a polyamidoimide resin by heat curing.

In the electric double layer capacitor of the present invention, the polyimide resin used as a binder component in the carbon type conductive adhesive layer, has high heat resistance. Therefore, the water in the carbonaceous material can be highly removed by drying by heat treatment at a high temperature or by heat treatment under reduced pressure after the electrode and the current collector are bonded. Further, such a resin has resistance against an organic electrolytic solution, and is excellent in the bond strength in a case of bonding an electrode sheet having a fluorine-containing resin as a binder to a current collector such as a metal. Thus, with the electric double layer capacitor of the present invention, the operation performance is stable, and the increase of the internal resistance of the electrode can be made small, even after repeating charging and discharging cycles at a large current density, or even after applying a voltage for a long period of time.

The resin to be used for a binder can be obtained in the form of a resin powder or a varnish. Therefore, such a resin is dissolved in a solvent such as N-methyl-2-pyrrolidone (hereinafter referred to as NMP), and carbon black or graphite fine particles which are the conductive carbon material, are dispersed therein as a conductive filler, to prepare a suspension. The suspension is coated as an adhesive, on the surface of the current collector by a coating method such as dropping, brushing or spraying, and then an electrode sheet prepared preliminarily is press-bonded on the surface, followed by heat drying preferably at a high temperature of at least 250° C., more preferably under reduced pressure, to strongly bond the electrode and the current collector.

In the present invention, the polyimide resin is contained in the carbon type conductive adhesive layer preferably in an amount of from 10 to 70 wt %. When the polyimide resin which is a binder component is contained in the carbon type conductive adhesive layer in an amount of at least 10 wt %, the practical bond strength can be obtained. However, if the binder component is contained too much, the electric resistance of the adhesive layer tends to be large. It is particularly preferably from 15 to 50 wt %.

The organic electrolytic solution to be used for the electric double layer capacitor of the present invention is not particularly limited, and an organic electrolytic solution containing a salt dissociable into ions in a known organic solvent, can be used. It is particularly preferred to use an organic electrolytic solution having dissolved in an organic solvent a salt comprising a quaternary onium cation represented by $R^1R^2R^3R^4N^+$ or $R^1R^2R^3R^4P^+$ (wherein each of $R^1$, $R^2$, $R^3$ and $R^4$ which are the same or different, is a $C_{1-6}$ alkyl group) and an anion such as $BF_4^-$, $PF_6^-$, $ClO_4^-$ or $CF_3SO_3^-$.

The above organic solvent may, for example, be a carbonate such as propylene carbonate, butylene carbonate, diethyl carbonate or ethyl methyl carbonate, a lactone such as γ-butyrolactone, sulfolane or a sulfolane derivative. Such solvents may be used singly or in combination as a solvent mixture of at least two of them.

The electrode material for the electric double layer capacitor of the present invention is a carbonaceous material having a specific surface area of at least 500 $m^2/g$. Particularly a carbonaceous material having a specific surface area of from 1,000 to 2,500 $m^2/g$ is preferred since the capacitance can be made large and the strength can be made high. The carbonaceous material may, for example, be activated carbon, carbon black or polyacene. It is particularly preferred to use an activated carbon powder, and it is more preferred to use it in combination with highly conductive carbon black, as a conductive material. In such a case, the conductive material is preferably contained in an amount of from 5 to 20 wt % in the electrode.

For the double layer capacitor of the present invention, the above electrode may be used for both the positive electrode and the negative electrode. However, either the positive electrode or the negative electrode may be made of the above electrode, and the other electrode may be made of a non-polarized electrode capable of charging and discharging, i.e. an electrode made mainly of an active material for a secondary cell.

The current collector of the present invention to electrically connect the electrode, may be any material so long as it has excellent conductivity and electrochemical durability. As such a current collector, a valve metal such as aluminum, titanium or tantalum, stainless steel, a noble metal such as gold or platinum, or a carbon type material such as a conductive rubber containing graphite, glassy carbon or carbon black. It is particularly preferred that the current collector is made of an aluminum foil from the viewpoint of its lightness and excellent durability.

The electrode assembly for the electric double layer capacitor of the present invention may be prepared, for example, by firstly forming a mixture of an activated carbon powder and carbon black with a fluorine-containing resin, into a sheet shape to obtain an electrode sheet. Then, a carbon type conductive adhesive in a form of a suspension containing a polyimide resin or a precursor for a polyimide resin, is coated on the current collector, and the above electrode sheet is pasted on the coated surface of the current collector, followed by heat drying at a temperature of at least 200° C. The heat drying is preferably conducted at a temperature of at least 250° C., in order to dry sufficiently and rapidly.

Now, the present invention will be described in further detail with reference to Examples (Examples 1 to 3) and Comparative Examples (Examples 4 and 5). However, it should be understood that the present invention is by no means restricted by such specific Examples.

EXAMPLES 1 to 5

Ethanol was added to a mixture comprising 80 wt % of coconut shell activated carbon powder (average particle size: 10 μm, specific surface area: 1,800 $m^2/g$) obtained by steam-activation method, 10 wt % of PTFE and 10 wt % of carbon black, followed by kneading. The kneaded mixture was formed into a sheet shape and further rolled to a thickness of 0.3 mm, and a sheet of 40 mm×40 m was cut out therefrom. The sheet was bonded and fixed by using a conductive adhesive, on the surface of a current collector made of an etched aluminum foil (a thickness of 0.1 mm).

The conductive adhesive was a suspension made by mixing NMP to a mixture comprising 20 wt % of a binder componetn and 80 wt % of graphite fine particles. As the binder component, one shown in Table 1 was used. The carbon type conductive adhesive was coated on the surface of the aluminum foil of the current collector, and the sheet-shaped electrode was press-bonded on this surface. Then, drying treatment was conducted at a heat-proof allowable temperature of the binder component contained in each suspension shown in Table 1 for 3 hours by heating under reduced pressure, to remove the water in each electrode.

The dried electrode assembly was moved to a glove box filled with argon gas with a low humidity. Then, a propylene carbonate solution having 1 mol/l of tetraethylammonium tetrafluoroborate dissolved therein, as an organic electrolytic solution, was impregnated to the electrode. A separator made of a polypropylene fiber nonwoven fabric was put between two sheets of electrode assemblies disposed so that their electrode surfaces face each other, to construct an electric double layer capacitor.

After measuring the initial capacitance and the internal resistance of the obtained electric double layer capacitor, charging and discharging at a constant current of 1A within from 0 to 2.8 V in a constant temperature chamber of 40° C. were repeated for 3,000 cycles, and the capacitance and the internal resistance after the 3,000 cycles were measured, whereupon the initial properties and the properties after charging and discharging cycles were compared, and the long term operation reliability of the electric double layer capacitor was evaluated in an accelerated manner.

TABLE 1

|  | Binder component of the conductive adhesive | Heat-proof temperature (temperature for drying under reduced pressure) | Initial properties | | Properties after the cycles test | |
| --- | --- | --- | --- | --- | --- | --- |
|  |  |  | Capacitance (F) | Internal resistance (Ω) | Capacitance (F) | Internal resistance (Ω) |
| Example 1 | U-varnish A by Ube Industries | 400° C. | 15.3 | 0.52 | 14.5 | 0.59 |
| Example 2 | Rikacoat SN20E by Shin-Nihon Rika | 350° C. | 15.4 | 0.51 | 14.7 | 0.56 |
| Example 3 | Varnish, N7525, by TOYOBO | 330° C. | 15.2 | 0.50 | 14.6 | 0.52 |
| Example 4 | Cellulose | 120° C. | 14.3 | 0.65 | 9.3 | 1.12 |
| Example 5 | Polyvinyl alcohol | 120° C. | 14.4 | 0.66 | 8.4 | 1.34 |

The electric double layer capacitor of the present invention has little deterioration in capacitance and little increase in internal resistance even after charging and discharging cycles are repeated for 3,000 cycles under such a test condition that accelerative deterioration at a high temperature is likely to occur, and it has high operation reliability even when used over a long period of time.

What is claimed is:

1. An electric double layer capacitor comprising an electrode containing a carbonaceous material having a specific surface area of at least 500 $m^2/g$, and an organic electrolytic solution capable of forming an electric double layer at the interface with the electrode, wherein the electrode is bonded to a current collector via a carbon type conductive adhesive layer containing a conductive carbon material and a polyimide resin.

2. The electric double layer capacitor according to claim 1, wherein the polyimide resin is a polyamidoimide resin.

3. The electric double layer capacitor according to claim 1, wherein the polyimide resin is contained in the carbon type conductive adhesive layer in an amount of from 10 to 70 wt %.

4. The electric double layer capacitor according to claim 2, wherein the polyamidoimide resin is a condensate of trimellitic acid and methylenebisaniline.

5. The electric double layer capacitor according to claim 1, wherein the electrode contains a fluorine-containing resin as a binder.

6. The electric double layer capacitor according to claim 1, wherein the electrode contains a polytetrafluoroethylene as a binder.

7. The electric double layer capacitor according to claim 1, wherein the current collector is an aluminum foil.

8. The electric double layer capacitor according to claim 1, wherein the organic electrolytic solution is an organic electrolytic solution containing at least one member selected from the group consisting of a quaternary ammonium salt and a quaternary phosphonium salt, as an electrolyte.

9. The electric double layer capacitor according to claim 1, wherein the solvent of a electrolytic solution is at least one member selected from the group consisting of propylene carbonate, butylene carbonate, diethyl carbonate, ethylmethyl carbonate, γ-butyrolactone and sulfolane.

* * * * *